(12) United States Patent
Sator

(10) Patent No.: US 6,417,483 B1
(45) Date of Patent: Jul. 9, 2002

(54) METHOD AND DEVICE FOR SOLDERING THE ENDS OF TUBULAR CONTAINERS, SPECIALLY TUBES

(76) Inventor: Alexander P Sator, Uwestr. 12, D-22528 Hamburg (DE)

( * ) Notice: Subject to any disclaimer, the term of this patent is extended or adjusted under 35 U.S.C. 154(b) by 0 days.

(21) Appl. No.: 09/446,599

(22) PCT Filed: Jul. 10, 1998

(86) PCT No.: PCT/EP98/04317

§ 371 (c)(1),
(2), (4) Date: Mar. 20, 2000

(87) PCT Pub. No.: WO99/02330

PCT Pub. Date: Jan. 21, 1999

(30) Foreign Application Priority Data

Jul. 11, 1997 (DE) ..................... 297 12 264 U

(51) Int. Cl.$^7$ .............................. B23K 26/00
(52) U.S. Cl. .............................. 219/121.64; 219/121.63
(58) Field of Search ...................... 219/121.64, 121.63, 219/121.78, 121.85, 121.65, 121.66

(56) References Cited

U.S. PATENT DOCUMENTS

| 4,550,238 A | 10/1985 | Van Herle |
| 4,699,684 A | * 10/1987 | Osborne ................ 156/379.6 |
| 5,066,846 A | * 11/1991 | Pirl ...................... 219/121.63 |
| 5,501,759 A | * 3/1996 | Forman ................. 156/272.8 |

FOREIGN PATENT DOCUMENTS

| DE | 22 61 388 | 7/1973 | |
| DE | 26 58 682 | 6/1978 | |
| DE | 35 05 272 | 3/1986 | |
| DE | 37 44 402 | 7/1989 | |
| EP | 0 061 352 | 9/1982 | |
| EP | 0 087 403 | 8/1983 | |
| EP | 839634 | * 5/1998 | ........... B29C/65/16 |
| GB | 2095615 | * 10/1982 | ........... B29C/27/02 |
| HU | 206 291 | 10/1992 | |
| JP | 60 060 497 | 4/1985 | |

OTHER PUBLICATIONS

Potente H et al: "Laserstumpfschweissen" Kunststoffe. vol. 87. Nr. 5, May 1997, pp. 590/591, 594 XP 000656827, No Translation.

* cited by examiner

Primary Examiner—M. Alexandra Elve

(57) ABSTRACT

Method for welding the ends of tubular containers filled with a pourable medium, in particular tubes, made from a thin-walled flat material which can be softened or melted through heat, wherein the tubular container is held in such a fashion that the end which is to be welded is accessible and the tubular container is heated at the accessible end in a peripheral region to a temperature which allows welding thereof, and the heated end is pressed together along an elongated welding seam transverse to the longitudinal extension of the container, wherein the tubular container is stationary and a laser beam is directed, via a deflection element positioned outside of the tubular container, onto the inner wall of the tubular container, and the deflection element is set into rotation for heating the peripheral region.

13 Claims, 2 Drawing Sheets

METHOD AND DEVICE FOR SOLDERING THE ENDS OF TUBULAR CONTAINERS, SPECIALLY TUBES

BACKGROUND OF THE INVENTION

The invention concerns a method and a device for welding the ends of tubular containers, in particular tubes, made from a thin-walled flat material which can be softened and melted by heat, wherein the tubular container is held such that the end to be welded is accessible and the tubular container is heated about a peripheral region at the accessible end to a temperature enabling welding and the heated end is pressed together along an elongated welding seam traveling transverse to the longitudinal extension of the container.

Many pourable or pasty media are packed in tubes e.g. cosmetics, tooth paste, shoe polish, creams and the like. The tubes can be made from a suitable malleable metallic, flat material. However, plastic has been utilized for same time, primarily for economical reasons.

Prior to sealing the end of the tubular container blank, the container is initially filled with the material to be packaged. The removal side is sealed with a suitable cap, such as a screw-on cap or the like. The fill end is sealed after filling. With malleable flat materials, the filling end has been conventionally folded along a line. Optionally, a linear pressing is effected in the end region. In this manner, an acceptable seal is guaranteed. However, this procedure cannot be used for plastics: the adjoined end must be welded or otherwise sealed.

DE 37 44 402 C2 discloses a method for sealing tubular containers made from plastic in which the end section is initially softened or melted in a suitable fashion through the introduction of heat prior to producing a sealing seam through pressing.

The softening is thereby effected by disposing a ring about the filling end provided with a series of nozzle openings, by means of which hot air is blown onto the outer wall of the filling end of the tube. Since a complete welding is normally required, substantial amounts of heat must be introduced externally, i.e. up to about 18 kW of electrical power. This method is prevalent in packaging technology today and is designated as the "hot-air" method.

In analogy to the hot-air method, a softening or melting of the end which is to be welded has been conventionally effected using ultrasound or microwave radiation.

All methods require the melting and subsequent pressing to be carried out in sequential product steps, since the device for melting the material cannot occupy the same space as the pressing device. In addition, it is normally necessary to cool down the initially heated tube following the pressing step, since undesirable plastic deformations could otherwise occur and the product might also be damaged by the heat. The additional effort associated with this cooling process makes the method extremely wasteful.

DE 22 61 388 describes a method for welding an end piece made from plastic to a tubular plastic body, with which a tubular section of the end piece is inserted into the tubular body. A laser is used to irradiate the outer side of the tubular body, whereby the tube rotates with the end piece. A pressing roller presses the warmed region together to effect a type of weldment.

SUMMARY OF THE INVENTION

It is the underlying purpose of the invention to create a method and a device for welding the ends of tubular containers, in particular tubes, which can be used for all types of tube plastic, which has low energy consumption and which guarantees a high production speed in a simple manner.

This purpose is achieved with a method for welding ends of tubular container filled with a pourable medium, in particular tubes, made from a thin-walled flat material which can be softened and melted by heat, wherein the tubular container is held such that the end to be welded is accessible and the tubular container is heated about a peripheral region at the accessible end to a temperature enabling welding and the heated end is pressed together along an elongated welding seam traveling transverse to the longitudinal extension of the container, wherein the tubular container is held stationary and a laser beam is directed, via a deflection element disposed outside of the tubular container, onto the inner wall of the tubular container, and the deflection element is set into rotation to heat the peripheral region.

The purpose is also achieved with a device for welding tubular containers filled with a pourable medium, in particular tubes, made from a thin-walled material which can be softened and melted by heat, having a holding device in which the tubular container is held such that the end which is to be welded is directed upwardly, and with a deflection element borne for rotation above the container and set into rotation via a rotational drive device, and with a laser whose beam is directed onto the deflection element in such a fashion that the laser beam coming from the deflection element is directed towards the inner side of the container proximate the open end to warm a peripheral region of the container, and with a pressing device for pressing together the upper end of the container to form a welding seam extending transverse to the axis of the container.

Naturally, the laser beam can only produce a light point or spot on the peripheral wall. Since a flat ring-shaped region extending about the periphery must be softened, a relative rotation between the laser beam and the container is necessary when only a laser light spot is used.

In the apparatus in accordance with the invention, the heating device comprises a laser whose beam is directed onto the inner peripheral wall. A rotational drive device rotates the laser beam relative to the tubular container by axially rotating an optical deflection element disposed outside of the container, about its own axis, with respect to the incident axis of the laser beam. The point of rotation of the deflection element is thereby disposed such that the point of reflection of the deflection mirror is precisely located on the rotational symmetry axis of the tubular container.

Direction of the laser beam onto the inner wall of the tubular container has the advantage that those regions of the tubular container are warmed which are directly utilized for welding.

A deflection mirror is preferentially utilized as the deflection element and is optimized to the associated wavelength. The deflection mirror is preferentially adjustable to change the deflection angle. A change in the deflection angle can permit adaptation to differing container diameters by varying the height of the laser light spot relative to the deflection mirror in the plane of rotation downstream of the deflection mirror. One can adapt to differing container radii relative to the central point of the deflection mirror through a relative upward displacement of the laser light spot (compared to containers having small radii) to compensate for the increased distance to the container wall. Instead of changing the deflection element angle, the deflection element can be linearly adjusted along the rotation symmetry axis of the tubular container to adjust the relative height of the laser light spot.

One should further note that rotation of a filled tubular container is disadvantageous for various reasons and the centrifugal forces associated with the required speed tend to push the product in a vertical direction towards and through the open end. For this reason, the laser beam or the deflection mirror are rotated. The average reflection point on the surface of the deflection mirror is preferentially rotated in the longitudinal axis of the tubular container.

Use of a suitable configuration for the laser deflection mirror and the container, with the deflection mirror being disposed outside of the tubular container, allows the tubular container to merely be positioned below the deflection mirror during production, prior to the warming and welding procedure.

Additional advantages result from the use of not one but two deflection mirrors. In this case, one deflection mirror is introduced onto the rotational symmetry axis of the tubular container such that this deflection mirror reflects the laser beam through 90 degrees and out of the rotational axis of the laser beam, which is coaxial to the rotational symmetry axis of the tubular container. Associated with this displaced reflection, a second deflection mirror is disposed at a distance from the first container corresponding to the smallest expected tubular container radius to function as the first deflection element. This configuration has the advantage of facilitating processing at substantially flatter angles for small tubular container radii to avoid distortion of the laser light spot into an ellipsoid due to a steep angle of incidence which would disadvantageously influence the energy profile and the weld.

The configuration having two deflection mirrors is rotated asymmetrically, wherein the first deflection mirror, analogous to the configuration having only one deflection element, is disposed axially symmetrically with respect to the tubular container and a second deflection element travels along a rotationally symmetric path.

Since the container must not be rotated and no component must be removed from the path of the pressing device pressing jaws before initiating the pressing procedure and since the method in accordance with the invention does not require a plurality of production steps for welding, the production speed in accordance with the invention is extremely high.

In accordance with an embodiment of the invention, an additional drive device can be provided in certain cases to produce an effective, cleaner welding seam. This device effects a linear oscillating motion of the deflection mirror during the coaxial rotation thereof, which is displaced by 90 degrees. The oscillating relative motion between the tubular container and the laser beam thereby produced leads e.g. to a wavy welded seam. The tubular container holding device is preferentially set into oscillating motion so that the light spot of the laser beam on the peripheral wall of the tubular container has a wave-shaped dependence when simultaneously rotated.

In accordance with an additional configuration of the invention, a beam shaping device is provided for optimizing the energy distribution profile of the laser beam for the respective weld. This normally corresponds to ah elongated elliptically shaped Gaussian curve, i.e. the transverse electromagnetic 00 mode of a laser beam. In this fashion, a soft transition between the melting zone and the surrounding non-melting zone is produced to result in a low stress, cleaner welding seam.

In an embodiment of the invention, a $CO_2$ laser is used to produce an effective laser beam. The standard wavelengths of this laser lie in a range between 9 and 12 $\mu$m. A complete melting of the material can be expected in this wavelength region.

If a laser having a wavelength of approximately 1 $\mu$m is used, a deeply acting dependence of the laser beam initially warms the inner material of the tubular container and then the material layers, from the inside towards the outside, in dependence on the temperature coefficient of the material. The laser beam thereby penetrates through the outer material layers without melting them and first melts an inner material layer. This method can be used for certain materials which are permeable to the $CO_2$ wavelength region.

For most plastics, a wavelength of 10 $\mu$m is normally preferred to create a reliable, complete weld. Moreover this wavelength can be economically generated using a carbon dioxide laser.

In dependence on the tubular container material, a fraction of the laser beam passes through the walls of the container and does not thereby contribute to warming the material.

In order to utilize the beam fraction which pastes through, one embodiment of the invention provides for coupling a reflector to the deflection element to reflect the penetrated laser beam back onto the peripheral region used for welding the container. In order to prevent the reflected laser beam from travelling directly back into the laser resonator to damage it or to endanger its operation, the reflected beam can advantageously be pointed to a position which is displaced by a certain amount in the peripheral direction relative to the first point of incidence of the laser beam. This embodiment of the invention then requires removal of the outer reflecting mirror prior to clamping in the pressing device. It is, however, also possible to lower the support for the tubular container in preparation for pressing before engagement of the pressing jaws. Another possibility is to dispose the heating device at a small separation from the pressing device to avoid relative motion between the outer reflector and the tubular container.

The rotational speeds required for effecting as optimal and complete a welding as possible directly depend on all other parameters of the device, in particular, on the type of plastic and the available laser power. The appropriate values therefor can, up to this point in time, only be determined experimentally. Using a laser source having approximately 100 Watts of output power, a welding seam width of approximately 5 mm, and with a tube made from polyethylene having a diameter of 28 mm, a rotation of approximately 450 revolutions per minute results in an acceptable quality for the weld. The rotational speed should be adjusted to the laser power, the width of the welding seam, the wavelength, the tube material and the beam shape.

The invention has many advantages. The device is relatively simple from a technical point of view and requires, above all, very little energy. The average electrical energy consumption of the device is approximately 1 kw. In addition, the product filled within the tubular container is not damaged and does not spray out during the heating procedure. The deflection mirror directing the laser beam onto the peripheral wall of a tubular container experiences a self-cleaning action due to its rotation, should material deposit on the mirror surface. As is conventional, one can additionally seal-off the beam device using a protective plate which is completely transparent to the wavelengths used. Finally, the device in accordance with the invention facilitates a high manufacturing speed.

BRIEF DESCRIPTION OF THE DRAWING

The invention is described below with reference to the drawings.

DESCRIPTION OF THE PREFERRED EMBODIMENT

Figures 1, 2:
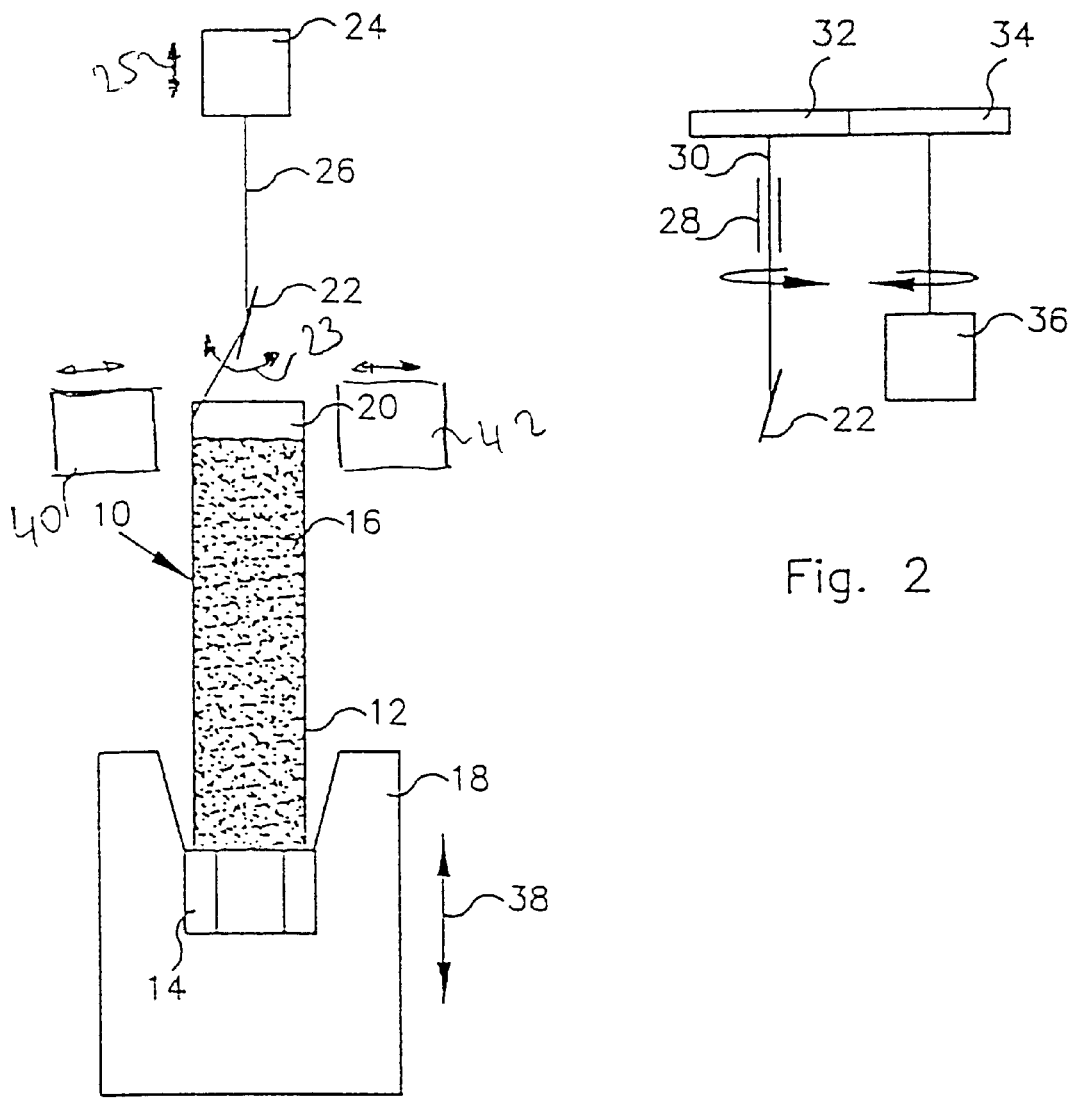
FIG. 1 schematically shows a device in accordance with the invention.
FIG. 2 shows details of the device according to FIG. 1.

As seen in FIG. 1, a tubular container 10 consists essentially of a tubular jacket 12 and a screw-on cap 14 for closing the container 10 at one end. Any type of cap mechanism can be used. One must only assure that the filling product 16 can not fall out of the tubular container 10 in the downward direction.

A holding device 18 (shown schematically) supports the container 10 at the cap 14 in the vertical position. The holding device 18 can e.g. be moved linearly, e.g. in the directions of the plane of the drawing. Clearly, the holding device 18 can support a plurality of containers of this type which can be sequentially brought into the position shown in FIG. 1. The container 10 is filled with the product 16 at a separate station.

The upper end of the container 10 or of the jacket 12 is open, as indicated by 20. A deflection mirror 22 is disposed above the container 10 to direct the beam 26 of a laser light source 24 onto the inner wall of the jacket 12. The mirror 12 rotates about the longitudinal axis of the tubular container 12, wherein the reflection point of the mirror 22 lies on this axis. A ring shaped region of the inner wall proximate the opening is thereby irradiated and warmed with the associated laser beam energy. FIG. 2 indicates, with 28, the manner in which the deflection mirror 22 is borne for rotation about the longitudinal axis of the container 10, wherein the shaft 30 has a gear 32 which engages a gear 34 driven by a drive motor 36. The mirror 22 rotates with several revolutions per minute. It can however rotate substantially faster, in dependence on the energy of the laser beam 26.

The angular position of the mirror 22 can also be changed, as suggested by the double arrow 23. This provides adjustment to the radius of the container 12, since the height of the light spot at the container wall changes correspondingly. Alternatively, the height of the mirror 22 can be adjusted. This is suggested by arrow 25 in FIG. 1, wherein the laser source 24 and the mirror 22 form an integral unit.

A translation can also be exercised during the relative rotation between the laser beam 26 and the container 10, e.g. to drive the holding device 18 in an oscillating fashion in the longitudinal direction of the container 10, as indicated by the double arrow 38. The associated drive device is not shown. A wave shaped region of the inner wall of the container 10 is thereby irradiated.

The device described can be used to warm and melt a peripheral region of the inner wall, wherein the previously open end 20 of the container 10 can be pressed together and welded, following preparation, using jaws 40 and 42 of a pressing device.

The device shown is not limited to plastic tubular containers and can also be used with metallic materials.

Figure 3:
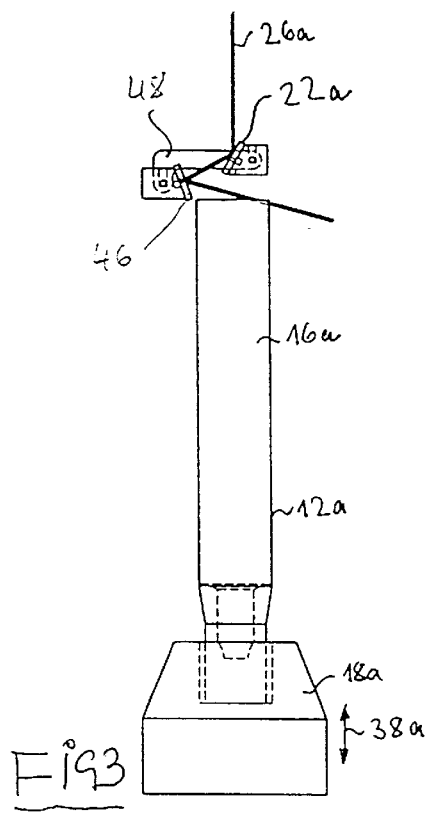
FIG. 3 schematically shows another embodiment of the device in accordance with the invention.
Figure 4:
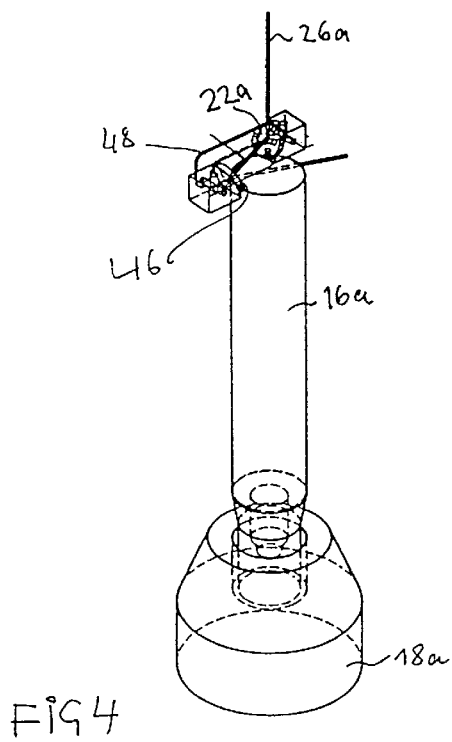
FIG. 4 shows the device of FIG. 3, in perspective view.

In the embodiment in accordance with FIGS. 3 and 4, components which are the same as those of FIGS. 1 and 2 are given the same reference symbols with an additional "a". A first deflection mirror 22a has an axis of rotation which is coaxial to the longitudinal axis of the tubular container 12a and which lies on the axis of the laser beam 26a. The beam is deflected from mirror 22a to an additional deflection mirror 46 which is positioned slightly above the tubular container 12a at a sideward, radial separation. This separation corresponds to the smallest radius of a container 12a to be welded. The mirror 26 holder is connected, via an arm 48, to the holder for the mirror 22a. The mirrors 46 and 22a thereby rotate together in a manner similar to that described in FIG. 1 to irradiate a linear or ring-shaped region on the inner wall of the container 12a. This configuration has the advantage that the direction of incidence of the laser beam on the wall of the container can be much steeper than that using one single mirror 22, in accordance with FIG. 1. A more even energy distribution is thereby achieved with higher radiation power.

Figure 5:
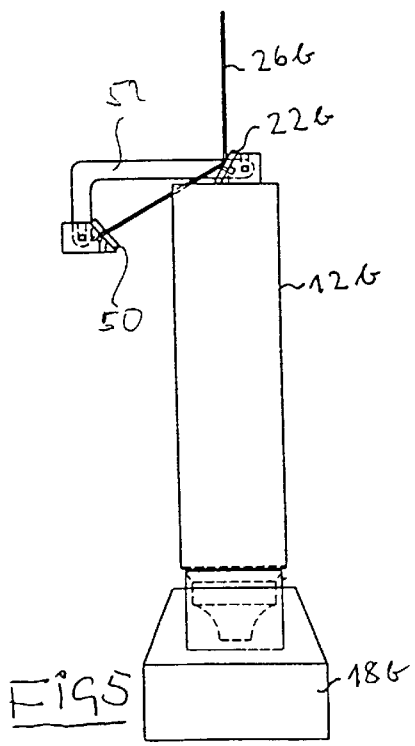
FIG. 5 schematically shows an additional embodiment of the device in accordance with the invention.
Figure 6:
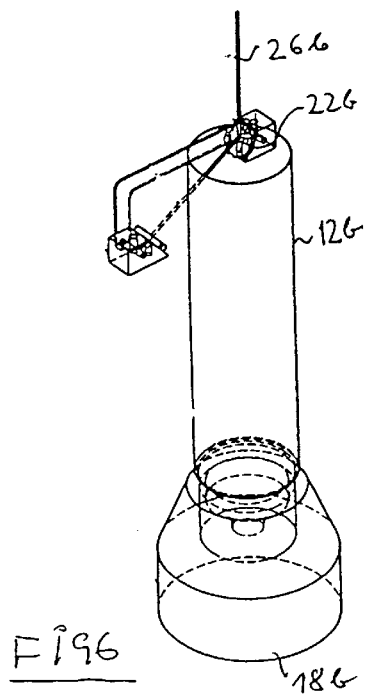
FIG. 6 shows a perspective view of the device according to FIG. 5.

In the embodiment in accordance with FIGS. 5 and 6, the same components as in FIGS. 1 and 2 are given the same reference symbols with the addition of a "b".

The configuration of the deflection mirror 22b corresponds approximately to that in accordance with FIG. 1 or 3 and 4, i.e. the axis of rotation of the mirror 22b lies on the same axis as that of the container 12b and is coincident with the axis of the laser beam 26b. A second deflection mirror 50 is located outside of the container 12b. Its support is connected, via an angle arm 52, to the support for the mirror 12b so that both mirrors 22b, 50 rotate together. The mirror 50 is disposed in such a fashion as to reflect the light passing through the wall of container 12b approximately back in the same direction. The light spot of the light reflected by the mirror 50 has the same height as the light spot of the beam coming from mirror 22b but is slightly displaced in the peripheral direction so that a back-reflection Into the laser resonator does not occur.

I claim:

1. A method for welding an end of a tubular container filled with a pourable medium, the container made from a thin-walled, flat material which can be softened and melted by heat, the method comprising the steps of:
    a) holding the container in a stationary manner with an end of the container which is to be welded being accessible;
    b) directing a laser beam, via a deflection element disposed outside of the container, onto an inner wall of the container
    c) rotating said deflection element;
    d) heating the inner wall of the container with said laser beat about a substantially ring-shaped peripheral region thereof, proximate said accessible end, to a temperature enabling welding; and
    e) pressing together said heated, ring-shaped region to form an elongated welding seam traveling transverse to a longitudinal extension of the container to seal the container.

2. The method of claim 1, wherein said deflection element comprises a deflection mirror.

3. The method of claim 2, wherein said deflection mirror is rotated about an axis of said container.

4. The method of claim 3, further comprising the step of producing, using an additional drive device, oscillating relative motion of the container relative to said laser beam during step c).

5. The method of claim 1, wherein said laser beam is a $CO_2$ beam.

6. The method of claim 1, is wherein said laser beam has a wavelength between 0.3 and 20 μm.

7. The method of claim 1, wherein said deflection element rotates at a rate of at least one rotation per minute.

8. A device for welding a tubular container filled with a pourable medium, the container made from a thin-walled material which can be softened and melted by heat, the device comprising:

means for holding the container with an end thereof, which is to be welded, directed upwardly;

a rotational drive device;

a deflection element borne for rotation by said rotational drive device above the container;

a laser having a beam incident on said deflection element such that said beam is reflected by said deflection element and directed onto an inner side of the container proximate an open end thereof to warm a substantially ring-shaped peripheral region thereof; and a pressing device for pressing together said ring-shaped peripheral region of the container to form a welded seam extending transverse to an axis of the container to seal the container.

9. The device of claim 8, wherein said said rotational drive device comprises means for changing a deflection angle of said deflection element in dependence on a diameter of the container.

10. The device of claim 8, further comprising reflector, coupled to said deflection element for rotation therewith and disposed on an outer side of the container for reflection of a beam passing through a wall of the container back onto said peripheral region.

11. The device of claim 10, wherein said reflector is disposed for reflecting said passing beam to a position on the container which is displaced in a peripheral direction relative to a point of incidence of a beam coming from said deflection element.

12. The device of claim 8, wherein said deflection element comprises a first deflection mirror disposed in an axis of said laser and a second deflection mirror disposed at a lower position, radially displaced from said first deflection mirror to direct a beam onto an inner wall of the container, wherein said first and said second deflection mirrors are set into common, mutually aligned rotation about a longitudinal axis of the container.

13. The device of claim 12, wherein a separation of said second deflection mirror from an axis of said laser is approximately equal to a radius of a smallest container.

* * * * *

UNITED STATES PATENT AND TRADEMARK OFFICE
CERTIFICATE OF CORRECTION

PATENT NO.    : 6,417,483 B1
DATED         : July 9, 2002
INVENTOR(S)   : Sator, Alexander P.

It is certified that error appears in the above-identified patent and that said Letters Patent is hereby corrected as shown below:

<u>Title page,</u>
Please insert -- [73] Assignee: IWKA Pacunion GmbH, Stutensee (DE) --.

Signed and Sealed this

Twenty-ninth Day of October, 2002

Attest:

Attesting Officer

JAMES E. ROGAN
*Director of the United States Patent and Trademark Office*